United States Patent

Hoff

[11] 3,747,721
[45] July 24, 1973

[54] MINI BIKE DRIVE KIT
[75] Inventor: Stephen J. Hoff, Richmond, Ind.
[73] Assignee: Hoffco, Inc., Richmond, Ind.
[22] Filed: Sept. 13, 1971
[21] Appl. No.: 179,770

Related U.S. Application Data
[63] Continuation-in-part of Ser. No. 73,916, Sept. 21, 1970, Pat. No. 3,625,079.

[52] U.S. Cl. 180/33 B, 74/230.17 A, 74/230.17 M, 74/230.17 S, 180/70 R, 240/204
[51] Int. Cl. B60k 17/06
[58] Field of Search 180/33 R, 33 B, 33 A, 180/70 R; 74/230.17 A, 230.17 E, 230.17 M, 230.17 S; 248/204

[56] References Cited
UNITED STATES PATENTS

| | | |
|---|---|---|
| 2,987,934 | 6/1961 | Thomas 74/230.17 E |
| 3,608,387 | 9/1971 | Fox 74/230.17 E |
| 2,173,661 | 9/1939 | Perrine 74/230.17 M |
| 3,365,967 | 1/1968 | Moogk 74/230.17 A |
| 2,678,566 | 5/1954 | Oehrli 74/230.17 E |
| 3,226,994 | 1/1966 | Harley 74/230.17 |
| 3,623,377 | 11/1971 | Lewis et al. 74/230.17 |
| 2,909,073 | 10/1959 | Putz 74/230.17 E |
| 2,709,372 | 5/1955 | Melone 74/230.17 E |
| 2,623,400 | 12/1952 | Davis 74/230.17 E |
| 2,612,054 | 9/1952 | Davis 74/230.17 E |
| 3,301,344 | 1/1967 | Mohs 180/33 |
| 2,454,991 | 11/1948 | Cooke 180/33 B |
| 2,543,337 | 2/1951 | Salsbury 180/33 R X |

FOREIGN PATENTS OR APPLICATIONS
368,050 3/1932 Great Britain 74/230.17

OTHER PUBLICATIONS
Torq-A-Verter, Comet Industries, Richmond, Indiana, Lit. 2156, Jan. 1970
Dayco Asymmetric Torque Converter, Dayco Corp., Dayton, Ohio, 1970

Primary Examiner—Leo Friaglia
Assistant Examiner—John P. Silverstrim
Attorney—Trask, Jenkins & Hanley

[57] ABSTRACT

A belt transmission kit for mini bikes and the like provides variable ratio drives with small offset between the belt plane and the drive chain. A mounting plate which bolts to the engine supports a jackshaft spaced from the crankshaft. Variable-width, asymmetric V-groove pulleys on the crankshaft and countershaft both have flat fixed pulley flanges on the inner side of the belt, close to the mounting plate, and movable pulley flanges on the outer side. This keeps the belt aligned in a plane close to the engine, and permits use of a drive sprocket and chain drive to the rear wheel in a plane only slightly offset from the belt, at the same side of the engine. The kit can be mounted on a direct-drive mini bike by removing the direct-drive sprocket, from the crankshaft, mounting the kit, and shortening the chain.

9 Claims, 4 Drawing Figures

Patented July 24, 1973
3,747,721
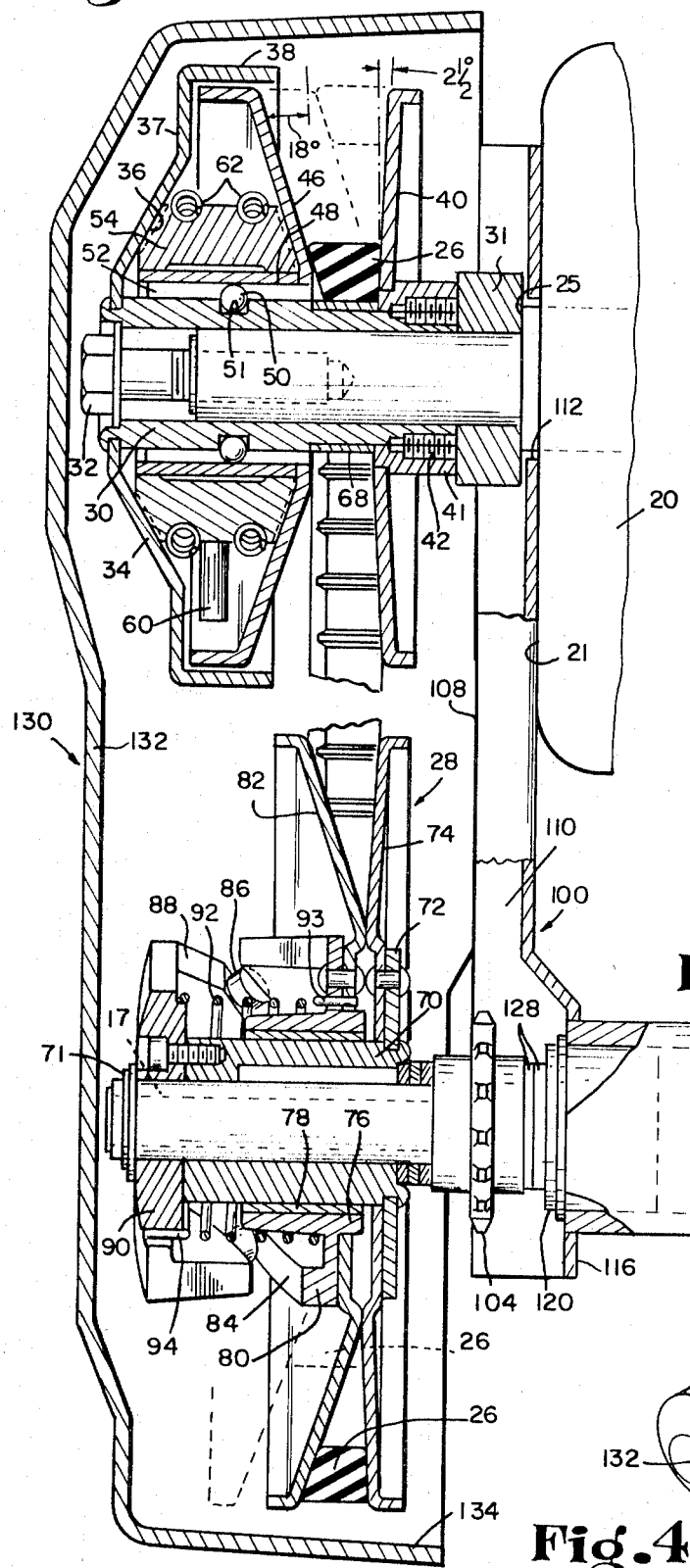
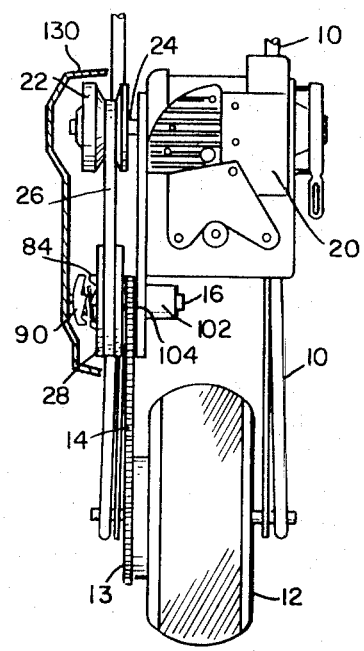
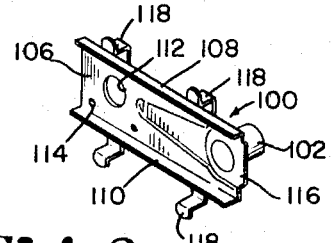
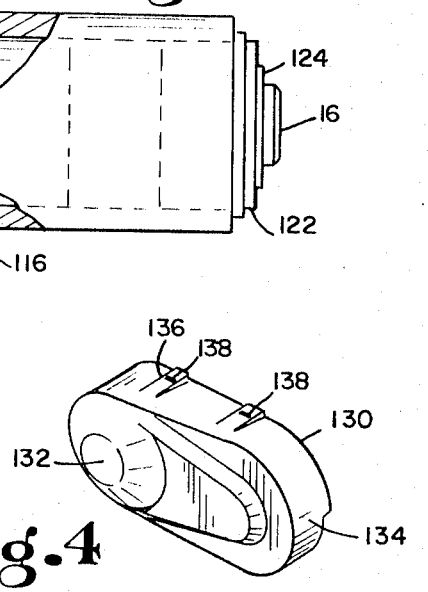

MINI BIKE DRIVE KIT

CROSS REFERENCE

This is a continuation-in-part of copending application Ser. No. 73,916, now U.S. Pat. No. 3,625,079 filed Sept. 21, 1970.

BACKGROUND OF THE INVENTION

The invention relates to a variable-ratio belt-drive for mini bikes and the like, and uses a variable-width V-groove driver pulley on the crankshaft and a variable-width V-groove driven pulley on a jackshaft. With symmetric pulleys, the belt moves laterally in each pulley as groove-width changes, which requires placing the fixed pulley halves on opposite sides of the belt plane so that the lateral movements of the belt are in the same direction in both pulleys. If the driver pulley is mounted with its fixed flange inward to reduce overhang on the engine shaft, this places the movable pulley flange and its bulky control mechanism of the driven pulley on the inward side and requires such a large offset between the belt plane and the plane of the drive chain that the belt and the chain are commonly mounted on opposite sides of the bike.

The aforesaid copending application discloses an efficient variable-ratio mini bike drive which provides reliable and smooth operation, and shows it in both a symmetric and an asymmetric configuration. The asymmetric configuration uses pulleys each having one flat fixed pulley flange and one conical movable pulley flange, and this permits the fixed flanges to be on the same side of the belt, since the belt has little or no lateral movement as the pulley groove-width changes and the belt moves inward and outward on the substantially flat fixed flanges.

The present invention takes advantage of this characteristic of the asymmetric configuration to provide a compact variable-ratio drive assembly or kit which permits the chain drive to the rear wheel to be on the same side of the bike as the belt, in a plane only slightly offset from the belt plane. The belt plane can be in substantially the same position on the crankshaft as with a symmetrical pulley system to give low overhang on the crankshaft, and close to the position of the crankshaft sprocket of a direct chain-drive train. Both the belt transmission and the output sprocket are mounted on a flat mounting plate which bolts directly to the side of the engine. With this kit, a direct-drive mini bike is easily converted to a variable ratio drive, by removing the direct drive sprocket from the crankshaft, bolting the mounting plate to the engine, and installing the driver pulley of the kit on the crankshaft in belted connection with the driven pulley, shortening the chain, and making not more than minor changes in the position of the engine on its mounting to adjust for alignment and length of the chain.

SUMMARY OF THE INVENTION

In accordance with the invention, a substantially flat mounting plate is provided which bolts against the side face of the engine and supports a jack shaft at its rear end in spaced parallel relation with the engine crankshaft. Two asymmetric variable-width V-groove pulleys are mounted on the two shafts with the fixed flat pulley flanges of both on the same side of their connecting belt and inward toward the engine and mounting plate. The pulley on the crankshaft is desirably a speed-responsive pulley, and that on the jack shaft is desirably a torque-responsive pulley, but variable width pulleys with other controls may be used. The movable flanges of the two pulleys are on the outer side of the belt and the plane of the belt lies close to the side face of the engine so that there is low overhang on the crankshaft. The flat inner flange of the driver pulley contributes to this low overhang, and permits the pulleys to be moved outward from the side face of the engine without moving the belt plane farther out than would be the case with symmetric pulleys. This allows a sprocket to be mounted on the jack shaft between the driven pulley and the mounting plate, and in substantial coplanar alignment with the rear wheel sprocket.

The transmission assembly or kit can be used to replace a direct drive with but little lateral adjustment of the engine to position its output sprocket in alignment with the wheel sprocket.

BRIEF DESCRIPTION OF THE DRAWINGS:

The accompanying drawings illustrate the invention. In such drawings:

FIG. 1 is a plan view of the engine and drive mechanism of a mini bike having a variable-ratio drive of asymmetric configuration embodying the invention;

FIG. 2 is a longitudinal section on the axes of the crankshaft and jackshaft of the transmission mechanism of FIG. 1; and FIG. 3 is a perspective view of the mounting plate for the transmission; and FIG. 4 is a perspective view of a shroud.

DESCRIPTION OF THE PREFERRED EMBODIMENT

The mini bike shown in FIG. 1 comprises a frame 10 having a rear drive wheel 12 fixed to a sprocket 13 driven by a chain 14. An engine 20 mounted on the frame 10 has the output end of its crankshaft 24 projecting outward to support a driver pulley 22 which is connected by a belt 26 to a driven pulley 28 mounted on the jackshaft 16.

The driver pulley 22 and driven pulley 28, with the belt 26, comprise a variable ratio drive mechanism more fully shown in FIG. 2. The driver pulley 22 comprises a hub 30 mounted against a spacer 31 on the engine shaft 24, bearing against a shoulder 25 on that shaft which projects slightly beyond the side face 21 of the engine 20. The hub 30 is held in place by a bolt 32 screwed into a tapped hole in the shaft 24. A reaction drum or cone 34 is fixed to the outer end of the hub and includes a conical section presenting an inner conical face 36 joined by a radial flange 37 to a drum portion 38. A fixed pulley flange 40 on an inner collar 41 is fixed to the inner end of the hub 30 by a plurality of circumferentially spaced axial set screws 42 threaded into tapped holes at the inter face between the collar 41 and the hub 30. A movable pulley flange 46 fixed to the end of a bearing sleeve 48 is mounted on the hub 30 for axial sliding movement. The flange and sleeve are prevented from rotation on the hub by four balls 50 set in sockets 51 in the hub 30 and engaged in axial keyways 52 in the bearing sleeve 48.

Two speed-responsive wedge-weights 54 are mounted about the bearing sleeve 48, and have front and rear pressure pads intermediate their arcuate lengths to bear against the conical faces of the movable pulley flange 46 and the reaction cone 34. Each weight 54 has a guide pin 60 fixed to its end in position to extend tangentially through a loosely fitting guide hole in the adjacent end of the opposite weight 54. The weights are biased to retracted position by a pair of garter springs 62 received in circumferential grooves in the weights on opposite sides of the plane of the two guide pins 60.

The driver pulley 22 serves both as a variable-pitch pulley and also as a clutch to disengage the belt 26. To this end, the movable pulley flange 46 is movable to the left in FIG. 2 to a position such that the pulley flanges 40 and 46 have no driving contact with the side faces of the belt 26. To support the belt under these circumstances and permit the driver sheave assembly 22 to rotate freely without wear on the belt, the hub 30 is provided with a rotatable bearing sleeve 68 mounted on a reduced portion of the hub 30 at the bottom of the V-groove, between the fixed collar 41 and a shoulder on the hub 30. The outer diameter of such sleeve 68 is smaller than the inner diameter of the bearing sleeve 48, so that the sleeve 48 and the movable pulley flange 46 can move over the outside of the bearing sleeve 68 toward the fixed flange 40.

The driven pulley 28 shown in FIG. 2 comprises a hub 70 keyed to the jackshaft 16 and carrying a fixed mounting plate 72 to which the fixed pulley flange 74 is riveted. A bearing sleeve 76 fitted with a bearing 78 is slidably and rotatably carried by the hub 70, and a movable pulley flange 82 is riveted to a flange 80 on such sleeve 76. The outer periphery of the flange 80 carries three circumferentially spaced helical cams 84 which bear against antifriction pads 86 carried by three cam-shaped bosses 88 on a fixed cam plate 90 bolted to the end of the hub 70. A torsion spring 92 has its ends 93 and 94 bent axially and engaged in holes in the mounting flange 80 and the fixed cam 90. The spring 92 is of a hand and stressed in a manner such that it biases the movable pulley flange 82 and its supporting mounting plate 80 in a rotational direction to cause the cam flights 84 to cam the movable pulley 82 toward the fixed pulley flange 74. This involves relative rotational movement of the flanges 74 and 82 in a direction such that the movable pulley flange moves forward in the direction of drive rotation as it is cammed toward the fixed pulley flange 74 by the cam flights 84.

Both pulleys 22 and 28 are of asymmetric configuration. The fixed pulley flange 40 of the driver pulley 22 has a very small face angle so that it is substantially flat and the movable pulley flange 46 has a relatively large face angle. As shown, the pulley flange 40 has a face angle of approximately 2 ½° and the movable flange 46 has a face angle of 18°, which gives an included angle between the faces of the two pulley flanges of 20 ½°. The belt 26 is similarly asymmetric, and is formed with one face at 2 ½° to mate with the fixed flange 40 and with the other face at 18° to mate with the movable flange 46. The driven pulley 28 has a fixed pulley flange 74 of the same 2 ½° face angle as the flange 40 of the driver pulley, and a movable pulley flange 82 of the same 18° angle as the driver pulley flange 46.

Because of the flat configuration of the fixed flanges 40 and 74 of the two pulleys, those fixed flanges are both on the same side of the belt. Movements of the belt in and out along the substantially flat faces of these fixed pulley flanges produces very little lateral movement, and no significant belt misalignment occurs. The 2 ½° face angle shown and 74 is small enough to minimize belt misalignment during ratio changes of the transmission, while large enough to avoid significant binding or scrubbing action between the relatively flat face of the belt 26 and the relatively flat faces of the pulley flanges.

The mini bike shown in FIG. 1 represents one which was originally designed for "direct-drive" but which with minimum change can be equipped with the variable speed drive shown. For direct drive, the engine 20 carries a sprocket on its shaft 24 which is directly connected to the wheel sprocket 13 at the left side of the wheel. To change this original design for use of the variable ratio drive, I provide a mounting plate 100 which bolts against the side of the engine 20 and which has a jackshaft support 102 in position to lie behind the engine and to support the jackshaft 16 in spaced parallel relation with the crankshaft 24. The driver pulley assembly 22 is mounted directly on the engine shaft 24, and the driven pulley assembly 28 is mounted on the jackshaft 16 which is journaled in the support 102. A narrow sprocket 104 is mounted between the driven pulley 28 and the mounting plate 100. The asymmetric configuration disposes the torque-responsive mechanism 84–90 at the outside of the driven pulley 28, and this allows the two pulleys to be mounted close beside the mounting plate 100, and permits the output sprocket 104 to be located coplanar with the wheel sprocket 13 and only slightly offset from the plane of the belt 26.

In comparison with the symmetric pulleys, the asymmetric pulleys used here have fixed pulley flanges 40 and 74 of substantially shorter axial dimension, which provides greater clearance behind the pulleys to permit the belt plane to remain close to the face of the engine to avoid excessive overhang on the crank shaft. This feature and the outside location of the torque-responsive mechanism of the pulley 28 provide the necessary clearance for mounting the output sprocket 104 in the same plane as a direct-drive sprocket on the crankshaft 24, while leaving the belt plane only slightly offset therefrom so that not more than minor adjustments of the position of the engine 20 are required for installation of the present variable speed transmission in place of a direct drive transmission. The mounting plate 100 and the two pulley assemblies 22 and 28 and their belt 26 can be provided as a kit with which either the original manufacturer or a purchaser can with minimum change substitute a variable speed transmission for a direct drive transmission.

The preferred form of mounting plate 100 shown in the drawings is formed as a steel stamping from heavy sheet metal, with a flat main wall 106 joined at its top and bottom edges to forwardly bent flanges 108 and 110. Toward the front there is a central opening 112 to pass the crankshaft 24 at the point where it projects from the side face 21 of the engine 20. Four bolt holes 114 are spaced about the opening 112 in position to pass mounting bolts for engagement in threaded openings in the face wall of the motor 20. Toward the rear, the plate is formed with an inwardly offset portion 116 to which a cylindrical sleeve is welded to form the jackshaft support 102. The top and bottom flanges 108 and 110 of the mounting plate carry four mounting brackets 118 for supporting a housing or shroud about the transmission.

The jackshaft 16 in the arrangement shown is a stub shaft containing a keyway 17, and is mounted in the sleeve 102 by means of two sets of ball bearings 120 and 122 received in the opposite ends of the sleeve. The inner or right end of the shaft 16 is grooved to receive a retaining ring 124 which bears against a washer at the end of the ball bearing 122.

The output sprocket 104 is located between the driven pulley 28 and the ball bearing 120 by a plurality of washers 128 which may be distributed in different numbers on opposite sides of the sprocket to vary its axial position. The sprocket 104 and the hub 70 of the driven pulley 28 are both keyed to the shaft 16 so they rotate together. The hub is held on the shaft by a washer and a retaining ring 71.

The transmission is desirably enclosed by a shroud 130, which may be molded from fiber-reinforced plastic. This is in the shape of an inwardly open housing having a front wall 132 and a peripheral wall 134. At its rear edges it is formed to provide grooved portions 136 with slots 138 therein to engage over the outturned ends of the mounting brackets 118. The molding body is sufficiently resilient to be sprung over such brackets and to retain the shroud thereon.

The complete transmission kit may include the mounting plate 100 with the jackshaft 16 mounted in the suppot 102 and with the sprocket 104, the spacer washers 128, and the driven pulley 28 mounted on that shaft. It also includes four bolts for mounting the plate to the engine, a driver pulley 22, a belt 26, and the shroud 130.

For installing the transmission on a bike having an engine 20 and a rear wheel 12 provided with a wheel sprocket 13, the mounting plate 100 is bolted against the face 21 of the engine 20, which disposes the jackshaft 16 in spaced parallel relation with the crankshaft 24, and disposes the output sprocket 104 substantially coplanar with the rear wheel sprocket 13. The original chain is shortened and strung about the sprockets. If necessary, the engine 20 may be adjusted on its mounting to bring the sprockets into coplanar relation and to adjust the tightness of the shortened chain. The drive pulley 22 is then mounted on the crankshaft 24, with the belt 26 about the two pulleys. The shroud is then snapped onto the mounting brackets 118.

The mounting plate 100 accurately locates the jackshaft 16 in spaced parallel relation with the crankshaft 24 so that the pulley adjustments and belt size can be pre-selected and no adjustment is necessary during installation.

In operation, when the engine is running at idling speed, the driver pulley 22 has its flanges 40 and 46 fully spaced apart as shown in FIG. 2, so that the belt 26 rides on the rotating sleeve 68 at the bottom of the groove and is declutched from the pulley. With the belt loose on the driven pulley 28, the torsion spring 92 will rotate the movable flange 82 in a direction to cause the cams 84 to push such flange to its fully closed position against the fixed pulley flange 74 and the belt takes a position at the outer periphery of the driven pulley as shown in full lines in FIG. 2.

As the engine is speeded up, the centrifugal weights 54 of the driver pulley 22 move the flange 46 toward the fixed flange 40 to cause such flanges to grip the sides of the belt. The transmission then transmits drive at its greatest, or "low" drive ratio, since the driver pulley is at its smallest effective radius while the driven pulley is at its largest effective radius. As the vehicle speeds up, the wedge weights 54 of the driver pulley respond to centrifugal force to cause such pulley to progressively close its V-groove to increase its effective radius. The resulting increased tension on the belt 26 acts on the driven pulley 28 to force its movable flange 82 outward away from its fixed flange 74 against the closing bias of the torsion spring 92 and the cam 84 and thereby reduce the effective radius of the driven pulley. In the outward movement of the movable flange 82, it rotates relative to the fixed flange 74 in a direction rearward of the drive rotation. The changes in the width and pitch of the driver and driven pulleys progressively reduce the drive ratio, down to a small ratio of 1:1. In the transmission as shown, the pulley and belt angles and size produce an overdrive, to a drive ratio of 0.83:1.

If increased torque is encountered, the driven pulley 28 responds thereto to increase the drive ratio. Such torque increases the belt pull, which in turn rotates the movable pulley flange 82 forward in the direction of drive rotation relative to the hub 70, and this causes the cams 84 to ride on the cam reaction pads 86 to force the movable pulley flange 82 toward the fixed flange 76 and reduce the width of the belt groove in the driven pulley. This in turn causes the belt to ride at a larger radius on the driven pulley and to draw it to a smaller radius on the driving pulley in counteraction to the wedge weights 54, and the wedge weights 54 are thereby forced inward to a more retracted position. This action increases the effective radius of the driven pulley 28 and decreases the effective radius of the driver pulley 22 and causes an increase in the drive ratio.

There is a continuous equilibrium between the speed response produced by the action of the centrifugal weights 54 in the driver pulley and the torque response produced by the action of the cam flights 84 in the driven pulley and the drive ratio is continuously and infinitely varied in response to these two actions to provide a drive ratio suited to the existing operating conditions.

Throughout the movements of the belts inward and outward in the V-grooves of the pulleys, the belt is continuously held against the relatively flat fixed flanges of the pulleys so that misalignment of the belt is held to a minimum which the belt will tolerate without harm.

I claim:

1. A variable ratio drive apparatus adapted to be readily attached as by bolts or the like to, and wholly supported by, the engine of a mini bike or the like having an engine and a drive wheel with a drive sprocket fixed to the drive wheel, comprising a speed-responsive driver pulley mounted on the engine shaft, a mounting plate mounted on the side of the engine adjacent said driver pulley, independently of other support and affixed thereto by bolts or the like, a jackshaft supported by said mounting plate between the engine shaft and the drive wheel, in predetermined parallel spaced relation with the engine shaft, a torque-responsive driven pulley mounted on said jackshaft and connected to said driver pulley by a belt, and an output sprocket or the like on said jackshaft between the inner face of the driven pulley and the mounting plate, on the same side of the mini bike as said pulleys and in position for chain connection to said drive sprocket, said drive apparatus being thereby wholly supported by the engine and the jackshaft being located in predetermined relation with the engine power shaft independently of other minibike structure, so as to permit ready mounting of the drive apparatus and to thereby provide and maintain said predetermined shaft spacing.

2. A variable-ratio drive apparatus for a mini bike or the like having an engine which includes a projecting power shaft projecting from a side face thereof for the reception of a drive pulley or the like, comprising a mounting plate for mounting to said side face of the engine and including a jackshaft support for supporting a jackshaft in spaced parallel relation with the power shaft of the engine to which it is mounted, a jackshaft which mounts in said jackshaft support, variable-width driver and driven pulleys and a belt, for connecting said power shaft and jackshaft, said pulleys being asymmetric and each having a substantially flat fixed pulley flange at the inner side thereof to lie adjacent the mounting plate, and having a conical movable pulley flange at the outer side thereof, and means to move the movable pulley flanges oppositely toward and away from the fixed flanges to vary the relative effective diameters of the pulleys and thereby vary the drive ratio between them, an output sprocket or the like beween the inner side of the driven pulley and the jackshaft support, shroud mounting brackets on said mounting plate, and a shroud shaped to enclose said pulleys and belt and having means for mounting the same on said brackets.

3. A variable-ratio transmission kit adapted for ready installation on a minibike or the like in place of direct drive, by mounting the same on the engine of the minibike, the engine having a flat side face for the reception thereof and from which a power shaft projects, comprising a mounting plate adapted to be wholly supported by the engine, having a mounting end portion adapted to fit against said side face of the engine and to be fixed thereagainst as by bolts or the like, a jackshaft support fixed to said mounting plate for supporting a jackshaft in predetermined spaced parallel relation with the power shaft of the engine, and a jackshaft for support thereby in position to project outward from said mounting plate in said predetermined relation with the power shaft, asymmetric variable-width driver and driven pulleys which mount on said power shaft and jackshaft, said pulleys each having a substantially flat fixed pulley flange at the inner side thereof to lie adjacent the mounting plate and a conical movable pulley flange at the outer side thereof, a belt for connecting said pulleys, and means to move said movable pulley flanges oppositely inward and outward in contact with said belt to vary the effective diameters of the pulleys and the drive ratio between them, and an output sprocket or the like which mounts on said jackshaft adjacent the inner face of the driven pulley thereon, between said pulley and the mounting plate and is driven by said driven pulley to transmit drive therefrom, said mounting plate being thereby mountable to the engine by bolts or the like to fix the jackshaft in predetermined spaced parallel relation with the engine shaft independently of other support, the pulleys being mountable on said shafts close to the plane of the said side face of the engine and providing for operation of said belt at all ratios substantially in a fixed plane adjacent to the said side face, and said sprocket being thereby positioned to operate in a plane close to the plane of the said side face of the engine.

4. A variable-ratio transmission kit as in claim 3 in which the means for moving the movable flange of the driver pulley is speed-responsive.

5. A variable-ratio transmission kit as in claim 4 in which the means for moving the movable flange of the driven pulley is torque-responsive, and acts to impose tension on the belt in opposition to that of the speed-responsive driver pulley.

6. A variable-ratio transmission kit as in claim 3 with the addition of shroud-mounting brackets on said mounting plate, a shroud shaped to enclose said pulleys and belt, and means for mounting the shroud on said brackets.

7. A variable ratio drive apparatus adapted to be readily attached as by bolts or the like to the engine of a minibike or the like, as in place of a direct-drive, for support by such engine and to provide a variable drive mechanism of narrow configuration and low overhang from the engine, said engine including a power shaft projecting from a side face of the engine, comprising a mounting plate adapted to be mounted as by bolts or the like against said side face of the engine, and to be wholly supported thereby, a jackshaft mounted on said mounting plate in position to project outward therefrom in predetermined spaced parallel relation with the power shaft of the engine, variable-width driver and driven pulleys respectively on said power shaft and jackshaft, and a belt connecting the two pulleys, said pulleys being asymmetric and each having a substantially flat fixed pulley flange at the inner side thereof, adjacent the mounting plate, and having a conical movable pulley flange at the outer side thereof, and means to move the movable pulley flanges oppositely toward and away from the fixed flat flanges to vary the relative effective diameters of the pulleys and thereby vary the drive ratio between them, and an output sprocket or the like on the jackshaft between the inner side of the driven pulley and the mounting plate, said drive apparatus being thereby wholly supported by said engine, said belt being disposed to operate at all ratios substantially in a fixed plane adjacent the face of the engine, and the sprocket lying between the belt plane and the mounting plate for chain connection to a wheel sprocket in a plane close to the plane of said engine side face.

8. A variable-ratio drive apparatus as in claim 7 with the addition of a bearing sleeve fixed to said mounting plate and projecting inward therefrom, the jackshaft being rotatably mounted in said bearing sleeve and the driven pulley and output sprocket being fixed to the jackshaft.

9. A variable-ratio drive apparatus as in claim 7 in which said means to move the movable pulley flanges comprises speed responsive means at the outer side of said driver pulley, operative to control the position of the movable flange of said pulley to vary the effective diameter thereof, and torque-responsive means at the outer side of said driven pulley, operative to control the position of the movable flange of said pulley to vary the effective diameter thereof.

* * * * *